United States Patent
Bhatia et al.

(10) Patent No.: US 12,277,158 B2
(45) Date of Patent: Apr. 15, 2025

(54) GENERATING TAGGED CONTENT FROM A LIST IN AN ELECTRONIC DOCUMENT

(71) Applicant: Oracle International Corporation, Redwood Shores, CA (US)

(72) Inventors: Vishank Bhatia, Sunnyvale, CA (US); Xu Zhong, Vermont South (AU); Thanh Long Duong, Point Cook (AU); Mark Johnson, Castle Cove (AU); Srinivasa Phani Kumar Gadde, Fremont, CA (US); Vishal Vishnoi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/326,855

(22) Filed: May 31, 2023

(65) Prior Publication Data
US 2024/0126800 A1    Apr. 18, 2024

Related U.S. Application Data

(60) Provisional application No. 63/416,560, filed on Oct. 16, 2022.

(51) Int. Cl.
*G06F 16/35* (2019.01)
*G06F 16/358* (2025.01)
*G06F 16/38* (2019.01)

(52) U.S. Cl.
CPC ............ *G06F 16/358* (2019.01); *G06F 16/38* (2019.01)

(58) Field of Classification Search
CPC ................................ G06F 16/358; G06F 16/38
See application file for complete search history.

(56) References Cited

U.S. PATENT DOCUMENTS 7,836,399 B2 * 11/2010 Gurcan ............... G06F 16/9577
715/244
8,380,753 B2 * 2/2013 Mansfield ............. G06F 40/137
707/791

(Continued)

FOREIGN PATENT DOCUMENTS

WO        2014/005610 A1    1/2014

OTHER PUBLICATIONS

"Automated Data Extraction", Retrieved from https://pdfix.net/solutions/extraction_pdf_data/, Retrieved on Jan. 18, 2023, pp. 1-3.

(Continued)

*Primary Examiner* — Loc Tran
(74) *Attorney, Agent, or Firm* — Invoke

(57) ABSTRACT

Techniques for maintaining list-type text formatting when converting content from a source content format to a destination content format are disclosed. A system generates text content by applying text formatting tags to segments of characters obtained from a source electronic document. The system parses a static-display type source electronic document to obtain character data of the characters in the source document. The system analyzes the parsed data to identify text arranged in a list-type text format in the source document. The system generates text content in a destination content format different from the source format by applying tags to segments of the text content designating the segments items in a list.

22 Claims, 8 Drawing Sheets

(56) References Cited

U.S. PATENT DOCUMENTS

| | | | |
|---|---|---|---|
| 9,798,925 B2 * | 10/2017 | Liu ....................... | G06F 40/258 |
| 11,586,661 B2 * | 2/2023 | Thangaraj ......... | H04M 1/72436 |
| 2015/0095022 A1 | 4/2015 | Xu et al. | |

OTHER PUBLICATIONS

"PDF tips & tricks", Retrieved from http://blog.apitron.com/2015/05/ordered-and-unordered-lists-in-pdf.html, May 22, 2015, pp. 1-5.

Giguel et al., "Daniel at the FinSBD-2 task : Extracting Lists and Sentences from PDF Documents: a model-driven end-to-end approach to PDF document analysis", Proceedings of the Second Workshop on Financial Technology and Natural Language Processing, Jan. 2021, pp. 67-74.

Pietro M. D., "Document Parsing with Python & OCR", Jul. 13, 2022, Retrieved from https://towardsdatascience.com/document-parsing-with-python-ocr-75543448e581, pp. 1-15.

* cited by examiner

100

Getting Your Passport

So you are looking to travel abroad, but you are not sure how to get your passport? It's easy! Here are the steps to obtain a U.S. passport:

1. Collect the necessary documents:

You'll need to collect the following documents:

- Proof of U.S. citizenship: You can show U.S. citizenship with a birth certificate, a previous passport, or a naturalization certificate.
- Government-issued photo identification: Examples include a driver's license, military ID, or state-issued ID.
- Passport photo: You'll need to have a passport photo taken. The photo must meet specific requirements, which can be found on the U.S. Department of State website.

2. Fill out form DS-11:

This is the application for a U.S. passport. You can fill it out online and print it. Alternatively, you can print it and fill it out by hand.

3. Pay the fees:

The fees vary depending on whether you are applying for a new passport, a renewal, or a child's passport. You can find the current fees on the U.S. Department of State website.

4. Submit your application:

You can submit your application at a Passport Acceptance Facility, which can be found at many post offices, courthouses, and libraries. Be sure to bring your application, documents, and payment with you to the Passport Acceptance Facility.

Fig. 3B

GENERATING TAGGED CONTENT FROM A LIST IN AN ELECTRONIC DOCUMENT

INCORPORATION BY REFERENCE; DISCLAIMER

The following application is hereby incorporated by reference: application No. 63/416,560, filed Oct. 16, 2022. The applicant hereby rescinds any disclaimer of claims scope in the parent application(s) or the prosecution history thereof and advise the USPTO that the claims in the application may be broader than any claim in the parent application(s).

TECHNICAL FIELD

The present disclosure relates to generating tagged content from the text of an electronic document. In particular, the present disclosure relates to maintaining list-type text formatting when converting content from a source content format to a destination content.

BACKGROUND

Electronic documents, such as portable document format (PDF) documents include text formatting, such as style formatting. A data file storing binary data representing the electronic document stores characters and metadata associated with the characters. For example, a character "a" that appears with a "bold" formatting style in the document may be stored in the data file as [character: a], [style: bold]. However, when another application reproduces content from the electronic document in another data format, such as html, the destination data format may have different rules for applying formatting styles to text. As a result, an application that presents data in the destination data format may be unable to reproduce the text formatting styles from the electronic document in the destination data format. The inability to reproduce text formatting styles may result in reduced clarity and emphasis, in creating a different semantic meaning of text or content, or providing reduced functionality, such as making linking to additional documents difficult or impossible.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3D illustrate an example embodiment; and

DETAILED DESCRIPTION

Figure 1:
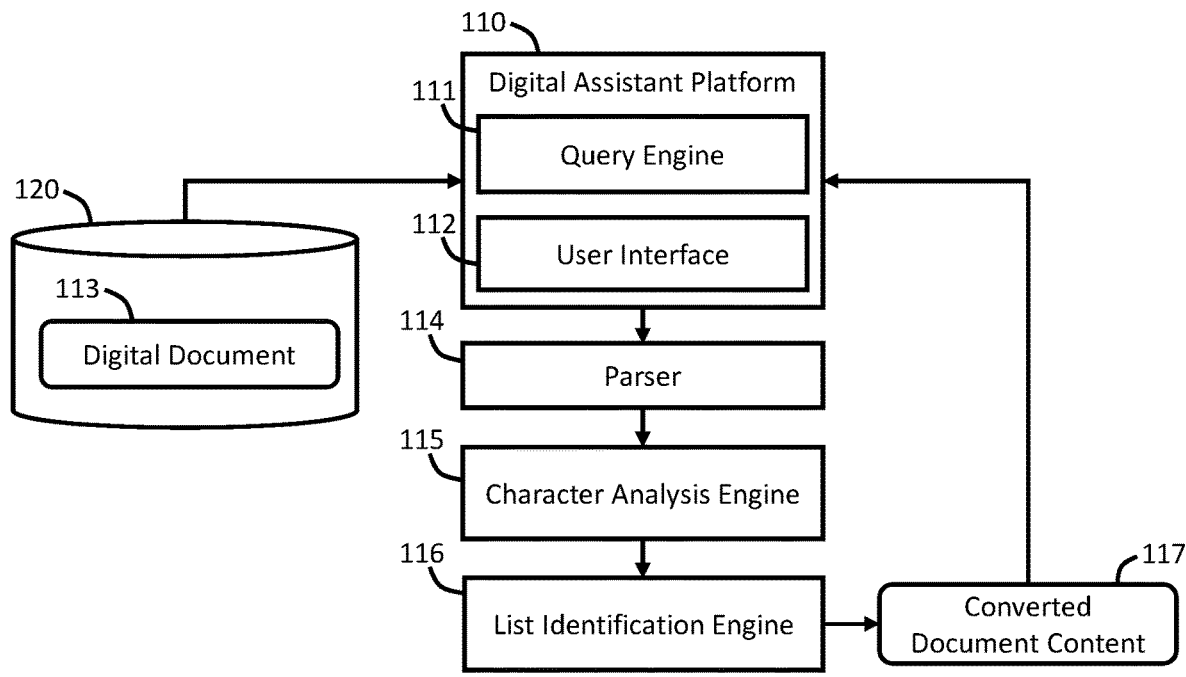
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING A DIGITAL DOCUMENT WITH LIST-TYPE FORMATTING
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

An application, such as a chatbot or a digital assistant, may respond to queries by accessing data from different electronic documents. The electronic documents may be formatted in a particular manner based on the layout of the document and based on the textual content in the document. For example, an electronic document may display a set of text as a list of items. A system may reproduce the list-type text formatting of the source electronic document in a different content format to generate a query response.

One or more embodiments maintain list-type text formatting when converting content from a source content format to a destination content. A system generates text content by applying text formatting tags to segments of characters obtained from a source electronic document. A system parses the source electronic document to obtain character data of the characters in the source document. The system analyzes the character data to identify portions of text in the source document that are arranged as lists. Lists may include ordered lists (e.g., 1, 2, 4; A, B, C, etc.) and unordered lists, such as lists with items designated with bullet points. The system generates text content in a destination content format different from the source format by applying tags to segments of the text content designating the segments as list items.

For example, a digital assistant may receive queries, search one or more databases for content to include in query responses, and generate the query responses. The system may identify content within a particular static-display type electronic document which matches query terms. For example, the query may include the terms "What are the largest microchip manufacturers?" The system may identify a PDF document with a list of microchip manufacturers arranged by size. The system parses the static-display type electronic document to identify character data. The static-display type electronic document stores data describing character position. However, the static-display type electronic document does not store data specifying whether text is in a list-type format. Continuing with the example, above, the PDF may identify a bullet point located at an x coordinate 42, and another bullet point at an x coordinate 42 in a row below the first bullet point. The PDF includes location data, but it does not contain data describing the rows as being a list.

The system compares the parsed character data, including a description of the type of character (such as alphanumeric or symbol-type), with sets of rules associated with list-type formats, including ordered lists and unordered lists. The system further performs a recursive analysis of list items to determine whether content identified as corresponding to list items also corresponds to a child item of a parent list item. The system converts the content identified as list-type content, based on the analysis of the parsed electronic document data, into a destination format. The destination format is a dynamic-display type format, such as html. The dynamic-display type format modifies character positions relative to each other when a user resizes a browser window displaying text content. The system displays the content from the electronic document in a list-type format in response to the query.

One or more embodiments identify child list items in a list. For example, the system may determine that a second row in a list is indented relative to the first row. In an unordered list, the system may disregard the type of symbol that begins the second row, since a child type list item in an unordered list may be associated with either the same symbol or a different symbol as a preceding row. In an ordered list, one or more embodiments determine whether an alphanumeric value among a set of characters that begins the second row is different than that of the first row. According to an alternative embodiment, the system may disregard whether a character in a set of characters that begins a subsequent row is different than in a preceding row. Instead, the system may determine only that the subsequent row is indented relative to the preceding row.

One or more embodiments identify content in a source document that is not formatted as a list in the source document, but which includes list-type content. For example, a sentence may read, "In case of a fire: stop, drop, and roll." The system may identify a list of items in the source document that is not formatted as a list. The system generates the list of items in a destination content format with a list-type formatting. For example, the system may start each word "stop," "drop," and "roll" on a separate row of destination content.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a digital assistant platform 110, parser 114, character analysis engine 115, list identification engine 116, and document content conversion engine 118. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

A digital assistant platform 110 receives a query request via a user interface 112. The user interface 112 and the digital assistant platform 110 may run on a same device, such as a same computer or server. Alternatively, the digital assistant platform 110 may run on a separate device from a client device which includes the user interface 112.

In one or more embodiments, interface 112 refers to hardware and/or software configured to facilitate communications between a user and the digital assistant platform 110. Interface 112 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 112 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 112 is specified in one or more other languages, such as Java, C, or C++.

In response to the query request, the query engine 111 analyzes the request to identify query terms and conditions. The digital assistant platform 110 searches a repository 120 to identify one or more electronic documents including content that matches the query terms. In one or more embodiments, the electronic documents are portable document format (PDF) type documents. The digital assistant platform 110 retrieves a particular digital document 113 that includes content matching the query terms.

The parser 114 parses data from the native format of the digital document 113 to identify character data in the digital document. For example, in an embodiment in which the digital document is a PDF document, the parser 114 identifies (a) each character in the digital document, (b) position data for each character, and (c) font and style data for each character. The position data may include coordinate data. For example, the parser 114 may identify a bounding box corresponding to the boundaries of each character. The location information may include coordinates corresponding to a part of the bounding box, such as a corner of the bounding box.

The character analysis engine 115 analyzes the character data from parsed content generated by the parser 114. According to one embodiment, the parser generates a binary file including the parsed data for each character. The character analysis engine 115 extracts character information for a particular set of characters in the parsed document content and provides the character information to the list identification engine 116. According to one embodiment, the character analysis engine 115 transmits to the list identification engine 116 character data for a predetermined number of characters corresponding to the beginning of a row of text in the digital document 113. The number of characters may be, for example, two characters or fewer. For example, the character analysis engine 115 may transmit to the list identification engine 116 character information for the first two characters of a row while refraining from transmitting character data for any other characters in the row. According to one embodiment, the system first determines whether a character data corresponds to an unordered list by analyzing two characters corresponding to the first two characters of a row of characters from the source electronic document. Based on determining that the characters do not correspond to an unordered list, the system may analyze additional characters following the first two characters to determine whether the characters correspond to an ordered list in the source electronic document.

The list identification engine 116 analyzes the character data of the set of characters associated with rows of the digital document 113 to identify text arranged in a list format in the digital document. In particular, while a document, such as a PDF document, may display text as a list format, including numbering (including sequences of numbers and/or letters) or bullet points (including bullet symbols, dashes, or any other symbol used to distinguish a list item from other text in the document) the character information generated by parsing the electronic document does not include any indication of which text is displayed as a list and which text is not.

Based on identifying list items in a set of text, the list identification engine 116 generates converted document content 117. The converted document content 117 includes (a) non-list content, and (b) list-type content. The list identification engine 116 generates the converted document content 117 by applying tags to particular segments of text content comprising sets of characters identified by the parser 114. For example, the list identification engine 116 generates a first tag identifying a beginning of list-type content. In an example embodiment in which the list identification engine 116 generates hypertext markup language (html) content, the list identification engine 116 may insert an opening tag <ul> and a closing tag </ul> at the beginning and end of an unordered list. Each item on the unordered list may be provided with opening and closing tags <li> and </li>, respectively. If the list identification engine 116 detects an ordered list, the list identification engine 116 may insert opening and closing tags, <ol> and </ol>, at the beginning and end of the list, respectively. Each item on the ordered list may be provided with opening and closing tags <li> and </li>, respectively. A browser translating the html content to generated displayed text formats the displayed text in a list format. A list displayed in a PDF document is static and does not change with the expansion or contraction of a window in which the PDF is displayed. In contrast, the text generated and displayed based on html content adapts to a size of the window in which it is displayed. For example, if a segment of text extends across multiple rows, a browser adds text to an end of a row when a user interacts with an interface element to increase a width of a browser window.

According to one or more embodiments, the list identification engine 116 recursively identifies list items and sub-list items. For example, a list may be arranged with a pattern: A, B, 1, 2, a, 4, a, 4, a, b, C, where "A, B, and C" correspond to one level of the list, "1, 2, and 4," correspond different items on a first sub-level, and "a, a, a, b" correspond to different lists in a same second sub-level of the list. The list identification engine 116 iteratively analyzes sets of characters (such as the first two characters) of each row of the list to identify each list item and whether each list item is a child of a previous list item.

According to an example embodiment, the list identification engine 116 stores a list as a data object of a type "ListSegment." In addition, the list identification engine 116 stores a list item on a list as a data object of a type "ListItem." The list identification engine 116 include start and end attributes to identify the beginning and end of the list, including all the items that make up the list. The data objects ListSegment and ListItem include attributes "bullet_type," "textbox_idx," and "bounding_box." The attribute bullet_type stores a bullet character associated with the list item. A bullet type may be a symbol, for example. Alternatively, a bullet type may be an alphanumeric character. The textbox_idx attribute includes a list of textbox indices of lines in a list. The bounding_box attribute includes coordinates of a bounding box associated with the list and list item, including x and y coordinates. In addition, the ListSegment data object includes a sub-object "children." The "children" sub-object stores a list of ListItem objects that are child items within the list.

Additional embodiments and/or examples relating to computer networks are described below in Section 4, titled "Computer Networks and Cloud Networks."

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the digital assistant platform 110. Alternatively, or additionally, a data repository 120 may be implemented or executed on a computing system separate from the digital assistant platform 110. A data repository 120 may be communicatively coupled to the digital assistant platform 110 via a direct connection or via a network.

Information describing digital documents 113, the converted document content 117, and list-type data objects may be implemented across any of components within the system 100. However, the digital document 113 information is illustrated within the data repository 120 for purposes of clarity and explanation.

In one or more embodiments, the digital assistant platform 110 refers to hardware and/or software configured to perform operations described herein for converting and displaying data in a list format based on detecting list-type content in a static-display type digital document, such as a PDF. Examples of operations for converting and displaying data in a list format based on detecting list-type content in a static-display type digital document are described below with reference to FIGS. 2A and 2B.

In an embodiment, the digital assistant platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating a Digital Document With List-Type Formatting

Figure 2A:
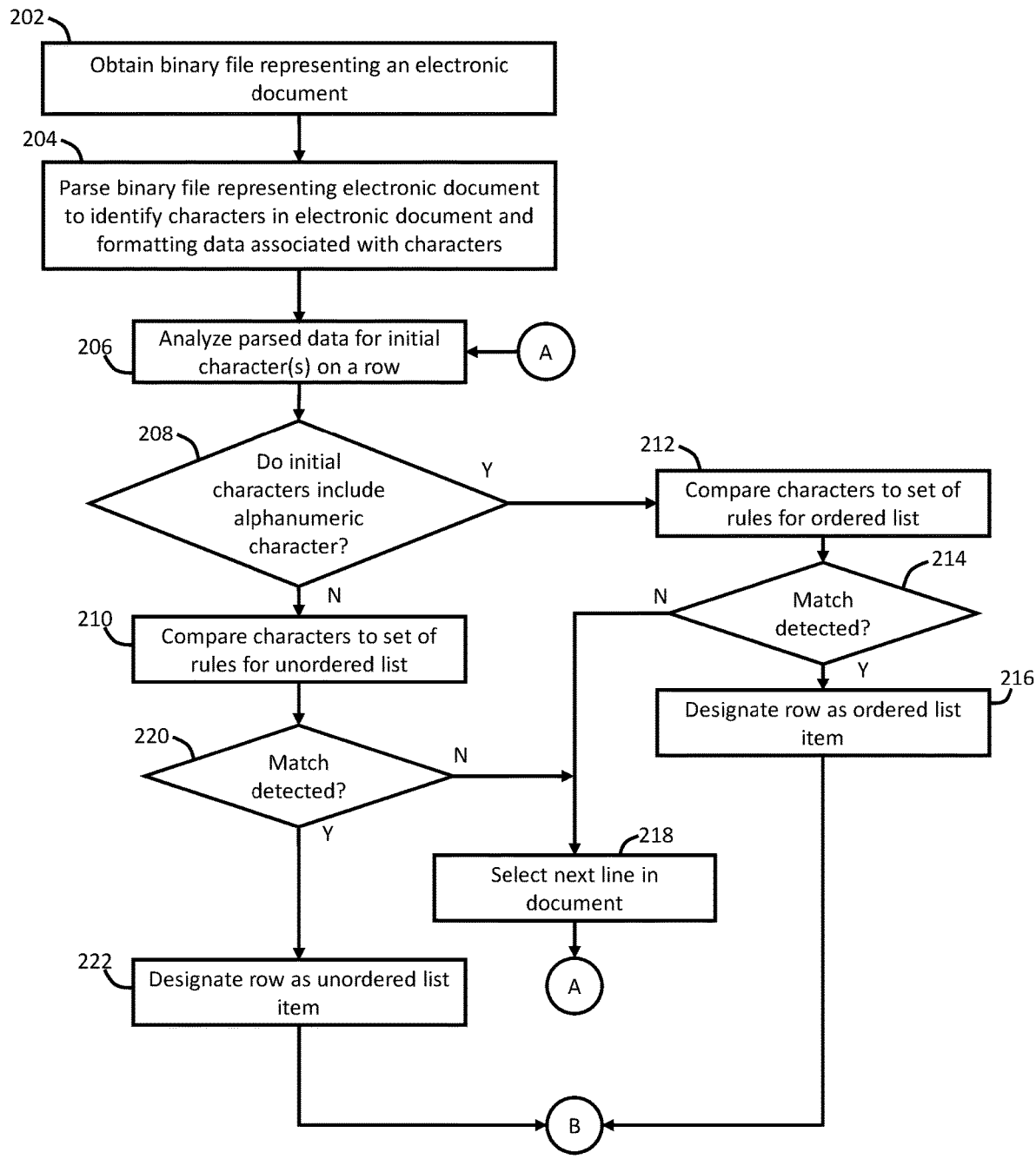
FIGS. 2A and 2B illustrate an example set of operations for converting a digital document with list formatting in accordance with one or more embodiments.
Figure 2B:
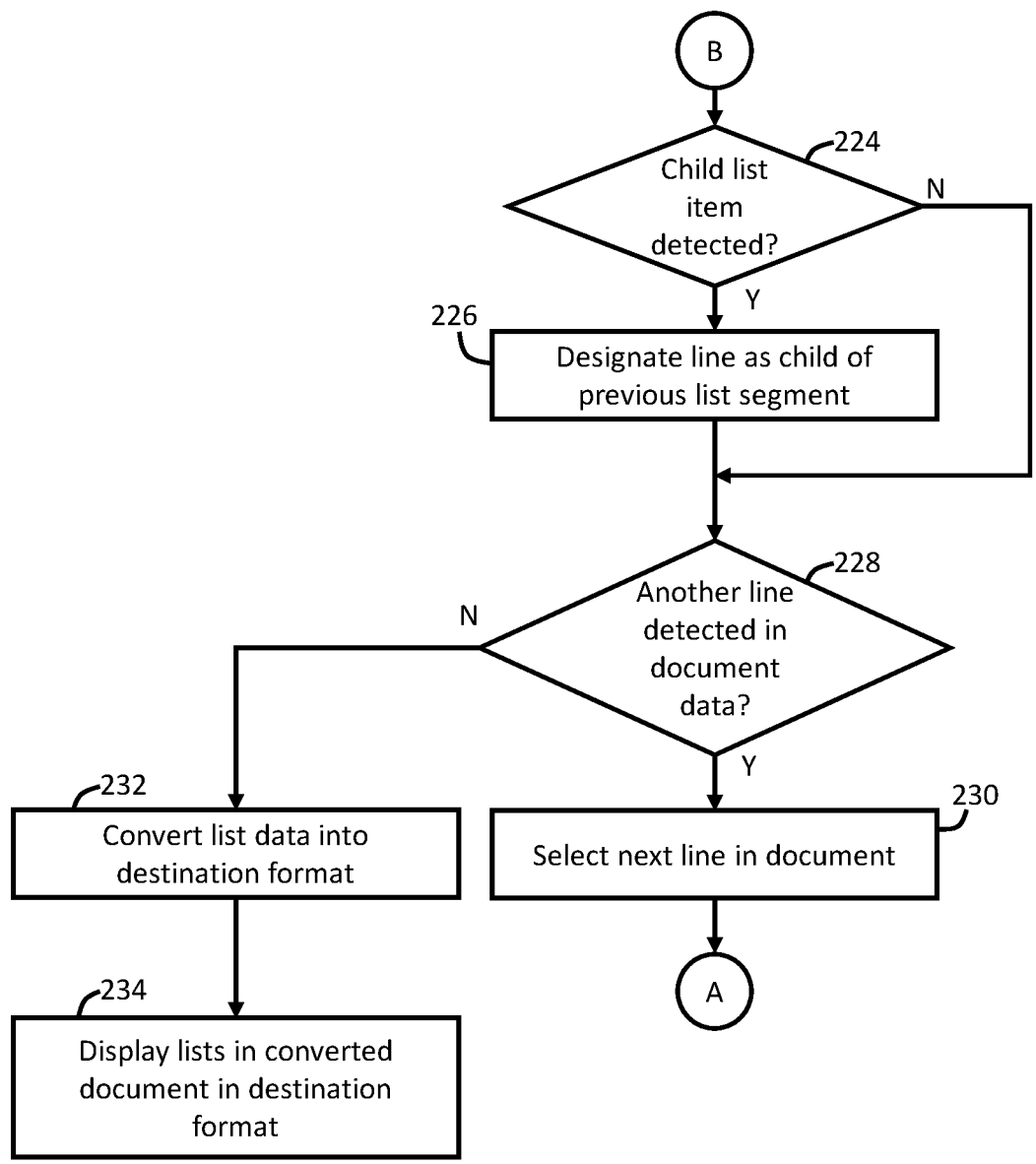

FIGS. 2A and 2B illustrate an example set of operations for converting and displaying data in a list format based on detecting list-type content in a static-display type digital document in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A system obtains a binary file representing an electronic document (Operation 202). The electronic document includes metadata specifying each character in the electronic document and a formatting style associated with characters. For example, the electronic document may include a sequence of characters "U-R-G-E-N-T." The document may include metadata associated with each letter indicating that each letter is displayed in a bold-type font style. In one or more embodiments, the electronic document is a static-display-type electronic document. A static-display-type electronic document maintains text and images in a constant position relative to each other, regardless of whether a user expands or contracts a display window. An example of a static-display-type electronic document is a portable document format (PDF) type document.

The system parses the binary file corresponding to the source electronic document to identify the characters in the document and the formatting data associated with the characters (Operation 204). For example, in an electronic document which, when displayed in a document viewer, includes the words "URGENT" in bold style and "read" in non-bold style, the system may apply a document-parsing program to a binary file representing the electronic document. The document-parsing program may return data including:

"[character: U][location: 25,45][dimensions: 8,16][font: Calibri][formatting: Bold]; [character: R][location: 25:54][dimensions: 8,16][font: Calibri][formatting: Bold] . . . [character: r][location: 41:12][dimensions: 8,8][font: Calibri]; [character: e][location: 41:21][dimensions: 8,8][font: Calibri]; [character: a][location: 41:30][dimensions: 8,8][font: Calibri] . . . "

In other words, the document-parsing program returns data identifying each character, and information describing how to display the character in the electronic document. The information may include location information, such as coordinate information, size information, font, and style formatting.

The system analyzes the parsed character data for a set of characters of a row displayed in the electronic document (Operation 206). For example, the system may identify, by analyzing the parsed data, each character having location information corresponding to an initial character of a row. In multi-column document, the system may identify each character with location information corresponding to an initial character of a row in the column. As another example, a static-display type electronic document may display a text box in one shape and text type and additional text in the document in a different text format. The system may identify each character in the text box with location information corresponding to an initial character of a row in the text box.

According to one or more embodiments, the system analyzes a set of one or more initial characters at the beginning of each row of the electronic document. For example, the system may analyze two or fewer characters at the beginning of each row. In other words, the system may analyze the first two characters of each row, and the system may refrain from analyzing any other characters in the row.

The system determines whether the set of analyzed characters includes an alphanumeric character (Operation 208). Alphanumeric characters include characters of the alphabet (a-z, A-Z) and numbers (0-9).

Based on determining that the set of analyzed characters does not include any alphanumeric character, the system compares the set of characters to a set of rules associated with an unordered list (Operation 210). For example, the system may determine whether an initial text character is indented relative to a left margin of a page or column. In addition, or in the alternative, the system may determine whether the initial character of one row is indented relative to an initial character of a preceding row in the source electronic document. In addition, or in the alternative, the system may determine whether a second character is indented relative to a left margin of a page or column. For example, if a list is a bullet type list, the bullet may be left-justified and text following the bullet may be indented a predefined distance from the bullet. As another example, the system may determine whether the analyzed initial character is indented relative to an initial character of a previous row.

Based on determining that the set of analyzed characters does include an alphanumeric character, the system compares the set of characters to a set of rules associated with an ordered list (Operation 212). In addition to analyzing the set of characters, the system may analyze additional, subsequent, characters to determine whether a row corresponds to a list item of an ordered list. For example, the system may analyze two characters corresponding to the beginning of a row to determine whether the characters corresponds to a list item of an unordered list. Based on determining that the characters do not correspond to a list item of an unordered list, the system may analyze the two characters, plus an additional set of characters (such as two or four additional characters), to determine whether the characters correspond to a list item of an ordered list.

The sets of rules associated with ordered and unordered lists include: whether a first character or a second character is indented, whether an initial character is the letter "o," whether consecutive rows include the same initial characters, whether consecutive rows include sequential characters (such as 1, 2, 4; A, B, C; I, II, III; etc.), and whether consecutive rows include a same indentation.

For example, the system may determine whether an initial text character is indented relative to a left margin of a page or column. In addition, or in the alternative, the system may determine whether the initial character of one row is indented relative to an initial character of a preceding row in the source electronic document. In addition, or in the alternative, the system may determine whether a second character is indented relative to a left margin of a page or column. As another example, the system may determine whether the analyzed initial character is indented relative to an initial character of a previous row. As another example, the system may determine whether an alphameric character in the set of analyzed characters is (a) at a same position relative to an initial character of a current row as a corresponding character of a previous row, and (c) sequential to the corresponding character of the previous row. For example, a list may include the characters "(""a"")" on one row and "(""b"")" on a following row. The system may analyze the first two characters of each row to identify the alphanumeric characters "a" and "b" both located as the second character in the row following a symbol "(". Further, the system identifies the characters following a sequential pattern. As another example, the system may analyze the first four characters of a row. The system may identify the characters "i. Th" and "ii. B" as the first four characters of two sequential rows. The system identifies the alphanumeric characters "i" in the rows preceding the punctuation "." Further, the system identifies the characters "i" and "ii" as being a sequential roman numeral pattern.

If the system identifies a match between the set of characters and the rules for an ordered list (Operation 214), the system designates the row of text as corresponding to an ordered list item (Operation 216). Designating a row of text as corresponding to an ordered list item may include identifying first and last characters of the row of text and applying tags to one or both of the beginning and the end of the row of text. Alternatively, the system may generate an intermediate content file to classify text and list-formatted text prior to generating destination-formatted content.

If the system identifies a match between the set of characters and the rules for an unordered list (Operation 220), the system designates the row of text as corresponding to an unordered list item (Operation 222).

On the other hand, if the system determines that the set of characters does not match a set of rules for an ordered or unordered list, the system selects the initial characters of the next row in the electronic document (Operation 218). The system analyzes the set of characters for the next row to determine whether the next row is associated with a list.

Upon determining that the set of analyzed characters corresponds to an ordered list item or an unordered list item, the system determines whether the list item is a child list item (Operation 224). For example, the system may determine that (a) the characters begin a list item row, (b) the row is indented relative to the preceding row, and (c) the preceding row corresponded to a list item. As another example, if the list includes ordered list items, the system may determine that (a) the characters begin a list item row, (b) the preceding row corresponded to a list item, (c) one of the list items is an ordered list item, and (d) the current list item includes a different type of symbol or alphanumeric character than the preceding list item.

Based on determining that the list item is a child of a previous list item, the system designates the list item as a child-type list item (Operation 226). For example, the system may store a data object specifying attributes for a particular list, including list items that comprise the list. The system stores any list items identified as child-type list items as a data attribute "children" associated with a list-type data object.

The system determines whether the parsed content includes data associated with another row of the electronic document (Operation 228). If another row exists, the system selects and analyzes the initial characters of the next line (Operation 230). The operation proceeds to step 206.

If the system determines that the parsed content does not include characters associated with a next row, the system converts list data into a destination format (Operation 232). According to one embodiment, the source format of the electronic document is a static-display type format. The destination format is a dynamic-display type format. In other words, the source format stores image data or data of each character relative to each other character and/or object in the electronic document. Resizing a window displaying the electronic document does not affect a relationship of characters relative to each other. For example, resizing a window displaying the electronic document does not result in a character from one row being displayed next to a character of another row. However, in the dynamic-display type format, resizing a window displaying text content from the electronic document results in alters a spatial relationship of characters relative to each other. Resizing a window displaying the text content may result in characters from one row shifting to another row.

According to one or more embodiments, converting the list data into the destination format includes applying tags to the list data. For example, the system generates a first tag identifying a beginning of list-type content. In an example embodiment in which the list system generates hypertext markup language (html) content, the system may insert an opening tag <ul> and a closing tag </ul> at the beginning and end of an unordered list. Each item on the unordered list may be provided with opening and closing tags <li> and a closing tag </li>, respectively. For an ordered list, the system inserts opening and closing tags, <ol> and </ol>, at the beginning and end of the list, respectively. Each item on the ordered list may be provided with opening and closing tags <li> and </li>, respectively. A browser translating the html content to generated displayed text formats the displayed text in a list format. A list displayed in a PDF document is static and does not change with the expansion or contraction of a window in which the PDF is displayed. In contrast, the text generated and displayed based on html content adapts to a size of the window in which it is displayed. For example, if a segment of text extends across multiple rows, a browser adds text to an end of a row when a user interacts with an interface element to increase a width of a browser window.

Based on converting the list data into the destination format, the system displays the list data in a list-type format (Operation 234). For example, the system may display content, extracted from an electronic document, in a web browser.

According to a particular embodiment, the system receives a query including particular terms. The system identifies a static-display type electronic document including content that matches the query terms. For example, the query may include the terms "which four countries have the highest populations?" The system identifies a PDF document with a list of countries and their populations. The system parses the static-display type electronic document to identify character data. The static-display type electronic document stores data describing character position. However, the static-display type electronic document does not store data specifying whether text is in a list-type format. The system analyzes the parsed character data. The system compares the parsed character data with sets of rules associated with list-type formats, including ordered lists and unordered lists. The system further performs a recursive analysis of list items to determine whether content identified as corresponding to list items also corresponds to a child item of a parent list item. The system converts the content identified as list-type content, based on the analysis of the parsed electronic document data, into a destination format. The destination format is a dynamic-display type format, such as html. The dynamic-display type format modifies character positions relative to each other when a user resizes a browser window displaying text content. The system displays the content from the electronic document in a list-type format in response to the query.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

A digital assistant application 301 receives a user request 302. In the embodiment illustrated in FIG. 3A, the user request 302 asks for the steps required to obtain a passport. The digital assistant includes the functionality to receive a user request as input, either via keystrokes or audio input, and to generate a query response in html format on a visual graphical user interface (GUI) display.

The digital assistant application 301 transmits the user request 302 to a query response engine 303. The query response engine 303 analyzes the natural language of the user request to generate query terms for one or more queries. The query response engine 303 searches contents of digital documents stored in a data repository 304 to identify digital documents that match the query terms. The digital documents include PDF-type documents 305. The query response engine 303 identifies a particular PDF document 306 that includes text matching the query terms.

FIG. 3B illustrates an example of the document 306 displayed in a PDF viewing application. The document 306 includes one or more terms 307 that match the query. The document 306 further includes content arranged in lists. The document 306 includes an ordered list 308, characterized by text in which each list item is numbered: 1, 2, 3, 4. The document 306 further includes an unordered list 309 that is a child list of the first list item in the ordered list 308. The unordered list 309 is describes a list of documents that are not arranged in any particular order. The unordered list 309 is identifiable as a list by bullet points preceding each list item 309a, 309b, and 309c.

Figure 3A:
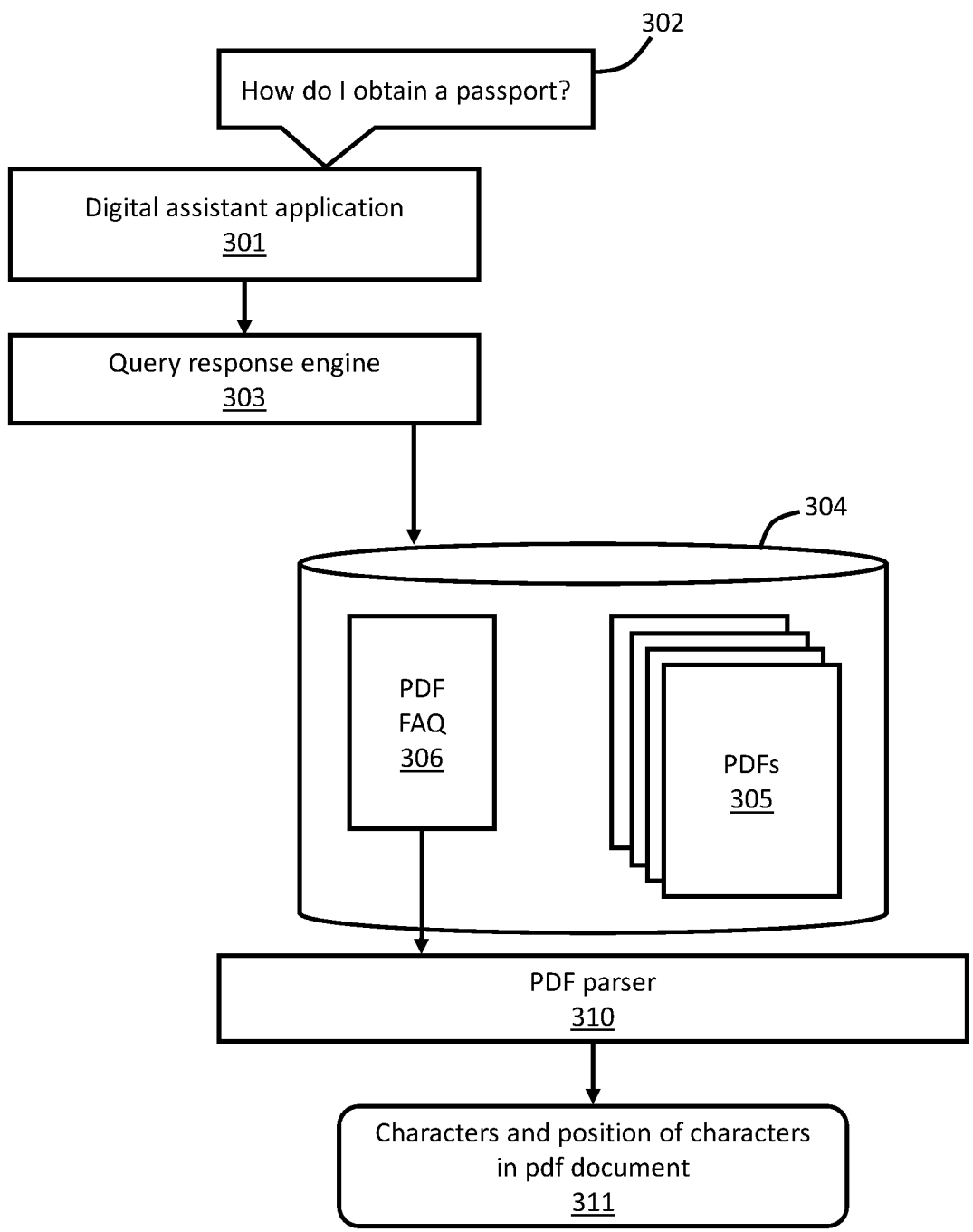

Referring to FIG. 3A, a PDF parser 310 obtains a binary file representing an PDF document 306. The binary file representing the PDF document 306 includes metadata specifying each character in the electronic document and a formatting style associated with characters. The PDF parser 310 parses the binary file corresponding to the PDF document 306 to identify the characters in the document, position of the characters, and the formatting data associated with the characters 311.

The document-parsing program may return data including:
"[character: G][location: 787,67][dimensions: 8,16][font: Rockwell][formatting: Bold]; [character: e][location: 797:67][dimensions: 8,10][font: Rockwell][formatting: Bold]; [character: t][location: 805:67][dimensions: 8,8][font: Rockwell]; [character: t][location: 810:67][dimensions: 8,8][font: Rockwell]; [character: i][location: 814:67][dimensions: 7,8][font: Rockwell] . . . "

In other words, the document-parsing program returns data identifying each character, and information describing how to display the character in the electronic document. The information includes coordinate information, size information, font, and style formatting.

Figure 3C:
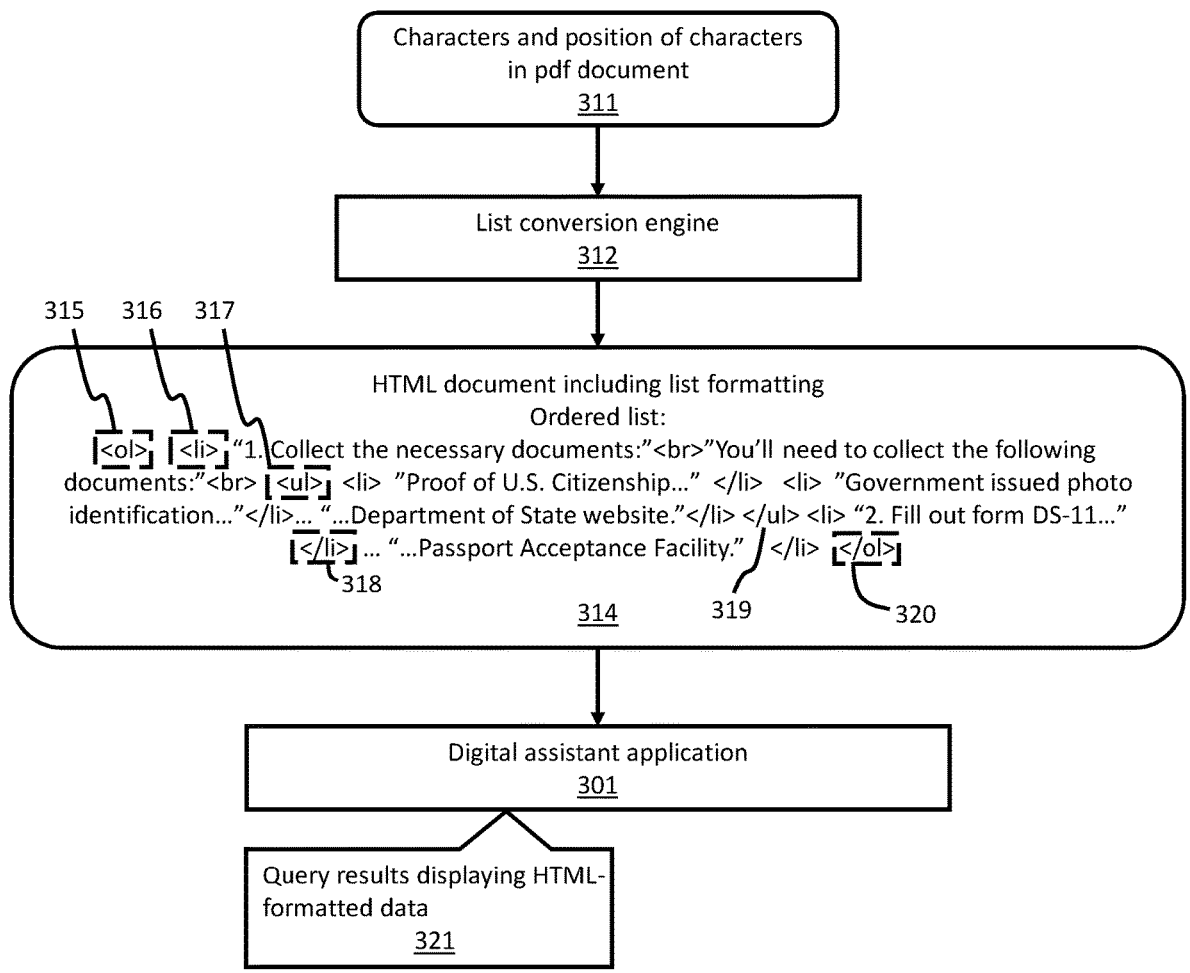

Referring to FIG. 3C, a list conversion engine 312 analyzes the parsed character data for a set of characters of a row displayed in the electronic document. For example, the system may identify, by analyzing the parsed data, each character having location information corresponding to an initial character of a row. In multi-column document, the system may identify each character with location information corresponding to an initial character of a row in the column. As another example, a static-display type electronic document may display a text box in one shape and text type and additional text in the document in a different text format. The system may identify each character in the text box with location information corresponding to an initial character of a row in the text box.

The list conversion engine 312 analyzes a set of one or more initial characters at the beginning of each row of the electronic document 306, as represented in the parsed character data 311. In the example embodiment of FIGS. 3A-3D, the list conversion engine 312 analyzes the first two characters of each row of characters. The list conversion engine 312 does not analyze additional characters beyond the first two characters in each row.

The list conversion engine 312 determines whether the set of analyzed characters includes an alphanumeric character (Operation 208). Alphanumeric characters include characters of the alphabet (a-z, A-Z) and numbers (0-9). The list conversion engine 312 identifies a set of four rows that begin with numbers 1, 2, 3, and 4, respectively in the parsed character data 311. The list conversion engine 312 further identifies four rows that begin with a bullet and are offset from the left margin of the document.

Based on identifying the four rows that begin with numbers 1, 2, 3, and 4, respectively, the list conversion engine 312 identifies the rows as beginning rows of items in an ordered list. Based on identifying the four rows that begin with bullet points and are indented, the list conversion engine 312 identifies the rows as items in an unordered list. Based on the location of the unordered list between two items in the ordered list, the list conversion engine 312 identifies the unordered list as a child list of the first item in the ordered list.

Having identified an ordered list and an unordered list that is a child of the first item in the ordered list in the PDF document 306, the list conversion engine 312 generates an HTML document 314 and decorates the content with markers identifying the lists and list items. For example, the list conversion engine 312 bounds each list item in the ordered and unordered list with markers <li> (316) and </li> (318), respectively. The list conversion engine 312 bounds each ordered list with markers <ol> (315) and </ol> (320), respectively. The list conversion engine 312 bounds each unordered list with markers <ul> (317) and </ul> (319), respectively. In the example illustrated in FIG. 3C, HTML markers related to generating lists are displayed, and other markers, such as formatting markers, are omitted for purposes of description only. For example, the HTML document 314 may include additional HTML markers specifying fonts styles and other characteristics of the text content.

Figure 3D:
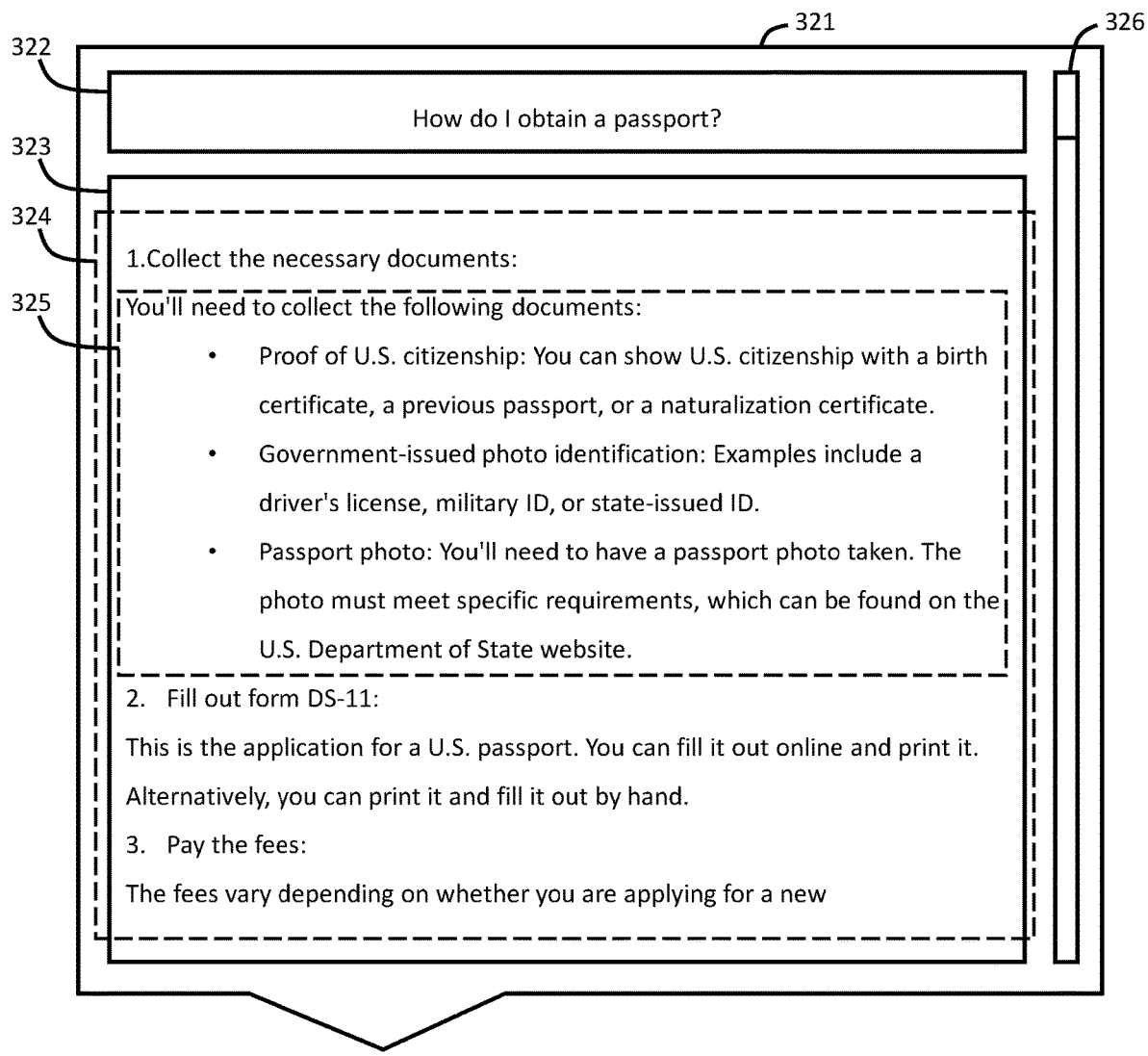

The digital assistant application 301 processes the HTML document 314 to display query results 321. Referring to FIG. 3D, the query results 321 include the question or request 322 entered by a user in a user interface, and content 323 from the PDF document 306 that matches the user's question. The digital assistant application 301 displays the content 323 in list format matching the lists of the PDF 306. However, unlike the PDF document, in which resizing the document does not change a relationship of words and characters to each other (for example, moving a right edge of the document toward the left edge does not cause a word to move from one line to another in a PDF document), the words and letters displayed in the query response 321 may change locations in response to user manipulation of a browser window, while maintaining the same list-type format. The content 323 is displayed with an ordered list 324 in which each list item begins with a number, and with an unordered list 325, which is indented relative to the first item of the ordered list. The digital assistant application 301 displays the query results 321 on a graphical user interface (GUI) including a web browser which includes a scroll bar 326 to allow a user to scroll through the content 323 to display new content that may be hidden when the scroll bar 326 is located at different positions.

Accordingly, the system described in the example embodiment converts list-type content from a PDF document, that matches query terms, into HTML-type content for displaying query results. The HTML-type content matches the list formatting of the PDF by generating HTML markers corresponding to ordered and unordered lists in the content.

Displaying the content in the list format allows a user to quickly identify relationships among different pieces of data which may be obscured when the data is displayed in a block of text. In addition, displaying child lists within parent lists allows a reader to quickly identify a relationship of a set of data in the child list to the data in the parent list. In addition, ordered lists allow a reader to quickly identify an order or sequence for a set of list items, whereas the order may be obscured when the content is presented in a block of text. One or more embodiments maintain the advantages of list-type formatting in PDF documents when converting the content in the PDF documents into an HTML format for displaying in a GUI of a digital assistant application.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
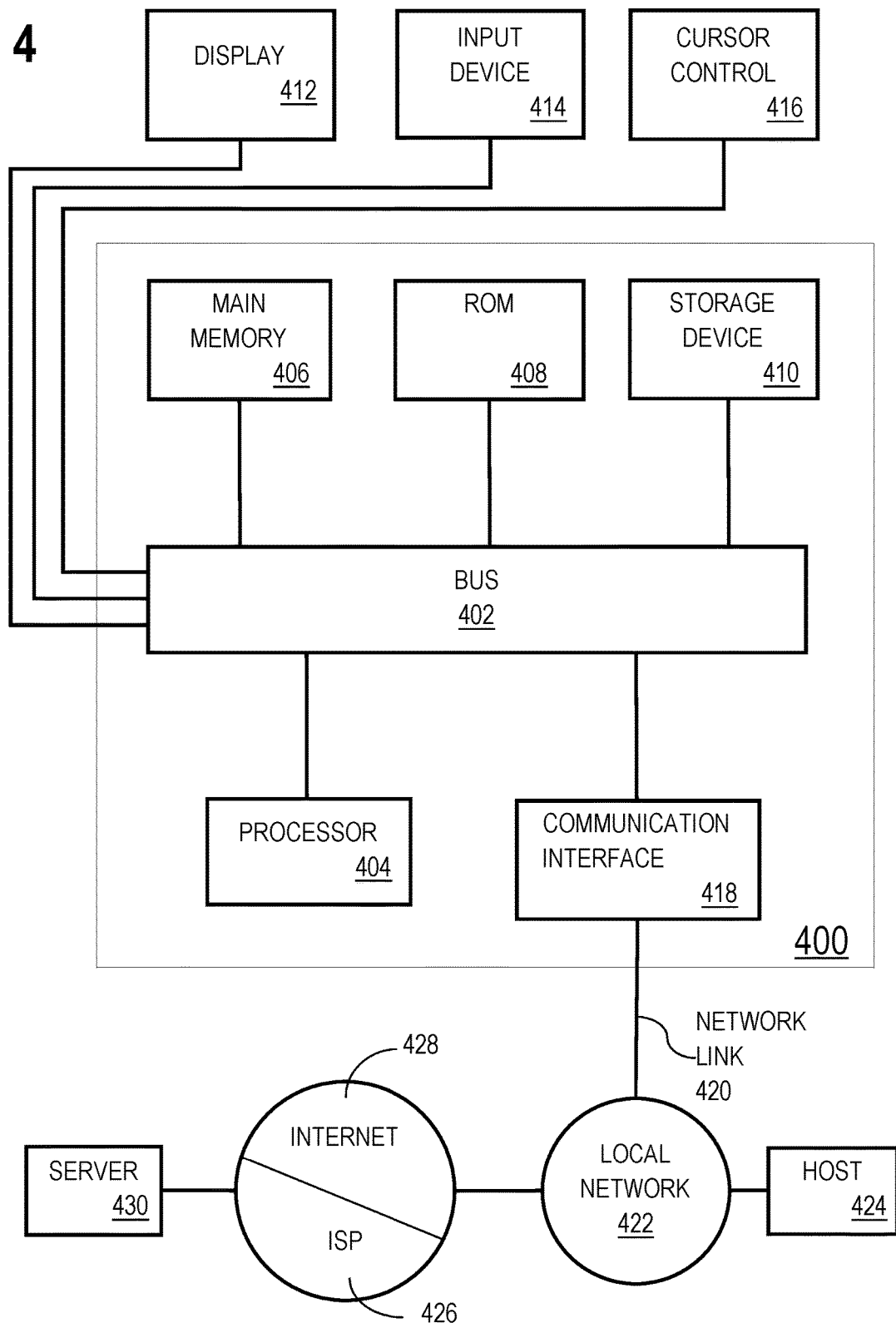
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
receiving a query specifying a set of query terms;
responsive to receiving the query, determining at least some content in an electronic document matches the query terms;
responsive to determining that at least some content in the electronic document matches the query terms:
parsing a first set of content in a digital file of the electronic document to identify a first row of text, of a plurality of rows of text, in the first set of content, wherein at least a portion of the first set of content matches the query terms;

applying a set of rules to one or more attributes of the first row of text to determine whether the first row of text meets one or more particular list- detection criteria;

based on applying the set of rules, determining that the first row meets the one or more particular list-detection criteria;

responsive to determining that the first row of text meets the one or more particular list-detection criteria:

classifying the first row of text as a first list item;

generating a second set of content, including a list of items, to be displayed on an interface at least by:

adding the first row of text to the second set of content; and formatting the first row of text, in the second set of content, for display of the first row of text as a first item in the list of items in the second set of content; and generating a response to the query including the first row of text formatted for display as the first item in the list of items in the second set of content, wherein applying the set of rules to the one or more attributes of the first row of text includes applying the set of rules to a set of characters including a first character and a second character of the first row, wherein the set of rules comprises:

a first rule determining whether at least one of the first character and the second character is an alphanumeric character, and wherein the operations further comprise, based on determining at least one of the first character and the second character is an alphanumeric character, applying a set of ordered list item type rules to a set of characters in the first row including at least the first character and the second character to determine whether the first row is an ordered list item.

2. The non-transitory computer readable medium of claim 1, wherein the operations further comprise displaying the second set of content including the list of items in response to the query.

3. The non-transitory computer readable medium of claim 1, wherein the operations further comprise displaying the second set of content as a search result in a web browser in response to the query.

4. The non-transitory computer readable medium of claim 1, wherein the operations further comprise converting the first row of text from a first format corresponding to the electronic document into a second format for display, wherein converting the first row of text into the second format comprises generating the second set of content, wherein formatting the first row of text for display as a first item in the list of items in the second set of content comprises:

generating a set of tags associated with the first row of text based on classifying the first row of text as a first list item, wherein the set of tags corresponds to the second format, wherein a content display application processes the set of tags to display the first row of text as the first item in the list of items.

5. The non-transitory computer readable medium of claim 1, wherein the operations further comprise:

applying the set of rules to one or more attributes of a second row of text to determine that the second row of text meets one or more sub-list detection criteria; and based, at least in part, on determining that the second row of text meets the one or more sub-list detection criteria, formatting the second row of text, in the second set of content, for display of the second row of text as a sub-list item in a sub-list of the first item.

6. The non-transitory computer readable medium of claim 1, wherein the operations further comprise:

recursively applying the set of rules to a plurality of attributes of a respective plurality of rows of text to determine whether one or more rows of text, among the plurality of rows of text, meets one or more sub-list detection criteria; and based, at least in part, on determining that a second row of text meets the one or more sub-list detection criteria, formatting the second row of text, in the second set of content, for display of the second row of text as a sub-list item in a sub-list of the first item.

7. The non-transitory computer readable medium of claim 1, wherein the operations further comprise:

applying a second set of rules to one or more attributes of one or more rows of text to determine whether the one or more rows of text include list-candidate content that meets one or more particular list-candidate criteria;

based on applying the second set of rules, determining that the one or more rows of text include list-candidate content that meets the particular list-candidate criteria;

responsive to determining that the one or more rows of text include list-candidate content that meets the particular list-candidate criteria:

classifying a first text of list-candidate content as a second list item; and classifying a second text of list-candidate content as a third list item;

generating a third set of content, including a second list of items, to be displayed at least by:

adding the first text and the second text to the second set of content; and formatting the first text and the second text, in the second set of content, for display of (a) the first text as a second item in the list of items in the second set of content, and (b) the second text as a third item in the list of items in the second set of content.

8. The non-transitory computer readable medium of claim 1, wherein the operations further comprise:

parsing the first set of content to identify a second row of text, of the plurality of rows of text, in the first set of content;

applying the set of rules to one or more attributes of the second row of text to determine that the second row of text is a continuation of the first row of text; and adding the second row of text to the second set of content subsequent to the first row of text as a continuation of the first item in the list of items.

9. The non-transitory computer readable medium of claim 1, wherein the operations further comprise:

identifying a second row of text, of the plurality of rows of text, in the first set of content;

applying the set of rules to one or more attributes of the second row of text to determine whether the second row of text meets the one or more particular list detection criteria;

based on applying the set of rules, determining that the second row does not meet the one or more particular list detection criteria;

adding the second row of text to the second set of content; and based on determining that the second row of text does not meet the one or more particular list detection criteria, formatting the second row of text, in the second set of content, for display outside of the list of items in the second set of content, wherein generating the response to the query further comprises displaying the second row of text outside the list of items in the second set of content in response to the query.

10. The non-transitory computer readable medium of claim 1, wherein the one or more particular list-detection criteria correspond to a list item type.

11. The non-transitory computer readable medium of claim 10, wherein applying the set of rules to one or more attributes of the first row of text includes applying the set of rules to the set of characters including the first character and the second character of the first row and excluding any additional characters of the first row, and wherein the list item type is an ordered list item type.

12. The non-transitory computer readable medium of claim 10, wherein applying the set of rules to one or more attributes of the first row of text comprises:

applying the first set of rules to a first character and a second character of a second row and excluding any additional characters of the second row;

based on determining the first character and the second character of the second row do not meet a set of ordered list criteria, applying a second set of rules to the first character and the second character to determine whether the first character and the second character meet a set of unordered list criteria, wherein the first set of rules comprises:

a first rule determining whether at least one of the first character and the second character of the second row is an alphanumeric character, wherein determining that first character and the second character of the second row do not meet the set of ordered list criteria comprises determining none of the set of characters is an alphanumeric character, and wherein the second set of rules includes a second rule determining whether the second row is indented relative to a third row, and a second rule determining whether at least one of the first character and the second character of the second row is a non-alphanumeric symbol.

13. A method comprising:

receiving a query specifying a set of query terms;

responsive to receiving the query, determining at least some content in an electronic document matches the query terms;

responsive to determining that at least some content in the electronic document matches the query terms:

parsing a first set of content in a digital file of the electronic document to identify a first row of text, of a plurality of rows of text, in the first set of content, wherein at least a portion of the first set of content matches the query terms;

applying a set of rules to one or more attributes of the first row of text to determine whether the first row of text meets one or more particular list- detection criteria;

based on applying the set of rules, determining that the first row meets the one or more particular list-detection criteria;

responsive to determining that the first row of text meets the one or more particular list-detection criteria:

classifying the first row of text as a first list item;

generating a second set of content, including a list of items, to be displayed on an interface at least by:

adding the first row of text to the second set of content; and formatting the first row of text, in the second set of content, for display of the first row of text as a first item in the list of items in the second set of content; and generating a response to the query including the first row of text formatted for display as the first item in the list of items in the second set of content, wherein applying the set of rules to the one or more attributes of the first row of text includes applying the set of rules to a set of characters including a first character and a second character of the first row, wherein the set of rules comprises:

a first rule determining whether at least one of the first character and the second character is an alphanumeric character, and wherein the method further comprises: based on determining at least one of the first character and the second character is an alphanumeric character, applying a set of ordered list item type rules to a set of characters in the first row including at least the first character and the second character to determine whether the first row is an ordered list item.

14. The method of claim 13, further comprising: displaying the second set of content including the list of items in response to the query.

15. The method of claim 13, further comprising: displaying the second set of content as a search result in a web browser in response to the query.

16. The method of claim 13, further comprising:

converting the first row of text from a first format corresponding to the electronic document into a second format for display, wherein converting the first row of text into the second format comprises generating the second set of content, wherein formatting the first row of text for display as a first item in the list of items in the second set of content comprises:

generating a set of tags associated with the first row of text based on classifying the first row of text as a first list item, wherein the set of tags corresponds to the second format, wherein a content display application processes the set of tags to display the first row of text as the first item in the list of items.

17. The method of claim 13, further comprising:

applying the set of rules to one or more attributes of a second row of text to determine the second row of text meets a second criteria corresponding to a sub-list item type; and formatting the second row of text, in the second set of content, for display of the second row of text as a sub-list item in a sub-list of the first item.

18. The method of claim 13, further comprising:

recursively applying the set of rules to a plurality of attributes of a respective plurality of rows of text to determine one or more rows of text, among the plurality of rows of text, meets a second criteria corresponding to a sub-list item type; and formatting the one or more rows of text, in the second set of content, for display of the one or more rows of text as sub-list items in one or more sub-lists of the first item.

19. The method of claim 13, further comprising:

applying a second set of rules to one or more attributes of one or more rows of text to determine whether the one or more rows of text include list-candidate content that meets a particular list-candidate criteria;

based on applying the second set of rules, determining that the list-candidate content meets the particular list-candidate criteria;

responsive to determining that the list-candidate content meets the particular list-candidate criteria:

classifying a first text of list-candidate content as a first list item; and classifying a second text of list-candidate content as a second list item;

generating a second set of content, including a list of items, to be displayed on an interface at least by:

adding the first text and the second text to the second set of content; and formatting the first text and the second text, in the second set of content, for display of (a) the first text as a first item in the list of items in the second set of content, and (b) the second text as a second item in the list of items in the second set of content.

20. A system comprising:

one or more processors; and memory storing instructions that, when executed by the one or more processors, cause the system to perform operations comprising:

receiving a query specifying a set of query terms;

responsive to receiving the query, determining at least some content in an electronic document matches the query terms;

responsive to determining that at least some content in the electronic document matches the query terms:

parsing a first set of content in a digital file of the electronic document to identify a first row of text, of a plurality of rows of text, in the first set of content, wherein at least a portion of the first set of content matches the query terms;

applying a set of rules to one or more attributes of the first row of text to determine whether the first row of text meets one or more particular list-detection criteria;

based on applying the set of rules, determining that the first row meets the one or more particular list-detection criteria;

responsive to determining that the first row of text meets the one or more particular list-detection criteria:

classifying the first row of text as a first list item;

generating a second set of content, including a list of items, to be displayed on an interface at least by:

adding the first row of text to the second set of content; and formatting the first row of text, in the second set of content, for display of the first row of text as a first item in the list of items in the second set of content; and generating a response to the query including the first row of text formatted for display as the first item in the list of items in the second set of content, wherein applying the set of rules to the one or more attributes of the first row of text includes applying the set of rules to a set of characters including a first character and a second character of the first row, wherein the set of rules comprises:

a first rule determining whether at least one of the first character and the second character is an alphanumeric character, and wherein the operations further comprise: based on determining at least one of the first character and the second character is an alphanumeric character, applying a set of ordered list item type rules to a set of characters in the first row including at least the first character and the second character to determine whether the first row is an ordered list item.

21. The non-transitory computer readable medium of claim 1, wherein generating the second set of content comprises:

generating a first data object of a first type to store attribute data for the list of items, the first data object comprising a first set of attributes, wherein the first set of attributes comprise:

a first attribute corresponding to a character type of at least one of a first character and a second character of respective items in the list of items;

a second attribute corresponding to a list of textbox indices of lines in the list of items; and a third attribute corresponding to coordinates of a bounding box associated with the list of items in the electronic document.

22. The non-transitory computer readable medium of claim 21, wherein generating the first data object of the first type further comprises:

generating one or more second data objects of a second type, the one or more second data objects representing sub-list items within the list of items; and storing a list of the one or more second data objects in the first data object.

* * * * *

UNITED STATES PATENT AND TRADEMARK OFFICE
CERTIFICATE OF CORRECTION

PATENT NO. : 12,277,158 B2  
APPLICATION NO. : 18/326855  
DATED : April 15, 2025  
INVENTOR(S) : Bhatia et al.

Page 1 of 1

It is certified that error appears in the above-identified patent and that said Letters Patent is hereby corrected as shown below:

In the Claims

In Column 19, Line 3, in Claim 1, delete "list- detection" and insert -- list-detection --, therefor.

In Column 21, Line 48, in Claim 13, delete "determining" and insert -- determining that --, therefor.

In Column 21, Line 60, in Claim 13, delete "list- detection" and insert -- list-detection --, therefor.

In Column 23, Line 34, in Claim 20, delete "determining" and insert -- determining that --, therefor.

In Column 23, Line 47, in Claim 20, delete "list- detection" and insert -- list-detection --, therefor.

Signed and Sealed this  
Twenty-second Day of July, 2025

Coke Morgan Stewart  
*Acting Director of the United States Patent and Trademark Office*